(12) United States Patent
Wagner

(10) Patent No.: US 9,663,179 B2
(45) Date of Patent: May 30, 2017

(54) HANDLEBAR STEM

(71) Applicant: Canyon Bicycles GmbH, Koblenz (DE)

(72) Inventor: Lars Wagner, Muehltal (DE)

(73) Assignee: CANYON BICYCLES GMBH, Koblenz (DE)

( * ) Notice: Subject to any disclaimer, the term of this patent is extended or adjusted under 35 U.S.C. 154(b) by 0 days.

(21) Appl. No.: 15/132,976

(22) Filed: Apr. 19, 2016

(65) Prior Publication Data
US 2016/0311497 A1    Oct. 27, 2016

(30) Foreign Application Priority Data
Apr. 21, 2015 (DE) ............ 20 2015 002 911 U

(51) Int. Cl.
B62K 21/16 (2006.01)
B62K 21/12 (2006.01)
B62K 21/18 (2006.01)

(52) U.S. Cl.
CPC ........... *B62K 21/16* (2013.01); *B62K 21/12* (2013.01); *B62K 21/18* (2013.01)

(58) Field of Classification Search
CPC ........ B62K 21/24; B62K 21/22; B62K 21/16; B62K 21/18; B62K 21/12; B62K 19/36
USPC ............... 74/551.3; 403/367, 365
See application file for complete search history.

(56) References Cited

U.S. PATENT DOCUMENTS

| | | | | |
|---|---|---|---|---|
| 1,444,774 A | * | 2/1923 | Bennett ................ | B62K 21/18 280/279 |
| 2,910,315 A | * | 10/1959 | Stevens .................. | F16B 2/065 403/367 |
| 4,310,260 A | * | 1/1982 | Katayama .............. | B62K 21/18 403/374.4 |
| 4,354,399 A | | 10/1982 | Katayama | |
| 5,477,747 A | * | 12/1995 | Cheng .................... | B62K 21/12 280/279 |
| 5,536,102 A | * | 7/1996 | Kao ........................ | B62K 21/12 403/320 |
| 5,842,385 A | * | 12/1998 | Su .......................... | B62K 21/16 280/279 |
| 5,988,573 A | * | 11/1999 | Mueller ................ | F16M 11/242 248/161 |
| 6,186,027 B1 | | 2/2001 | Nielsen | |
| 2004/0112168 A1 | | 6/2004 | Alley | |

(Continued)

FOREIGN PATENT DOCUMENTS

FR      435454    * 3/1912
FR      2420474 A1   10/1979

(Continued)

OTHER PUBLICATIONS

German Search Report dated Mar. 7, 2016 for German application No. 202015002911.6.

*Primary Examiner* — Anne Marie Boehler
(74) *Attorney, Agent, or Firm* — Ohlandt, Greeley, Ruggiero & Perle, LLP

(57) ABSTRACT

A handlebar stem for bicycle handlebars has a stem element connected to a holding element. The holding element has a tube opening and surrounds a steer tube in the mounted state. A clamping element is arranged in the holding element. Using a clamping device, a clamping force is exerted on the clamping element for fixing the handlebar stem to the steer tube.

11 Claims, 2 Drawing Sheets

(56) References Cited

U.S. PATENT DOCUMENTS

| | | | |
|---|---|---|---|
| 2004/0183273 A1 | 9/2004 | French | |
| 2007/0132203 A1* | 6/2007 | Yamakoshi | B62K 19/36 280/288.4 |
| 2010/0186544 A1* | 7/2010 | Tsai | B62K 21/16 74/551.3 |
| 2010/0282017 A1* | 11/2010 | Hermansen | B60B 27/026 74/551.3 |
| 2012/0255391 A1* | 10/2012 | Gueugneaud | B62K 21/12 74/551.1 |
| 2016/0016632 A1* | 1/2016 | Wagner | B62J 1/08 280/281.1 |

FOREIGN PATENT DOCUMENTS

| | | |
|---|---|---|
| FR | 2436065 A1 | 4/1980 |
| FR | 2442757 A1 | 6/1980 |
| GB | 2494714 A | 3/2013 |
| JP | 2872989 B1 | 3/1999 |
| JP | 11139379 A | 5/1999 |
| JP | 2000309293 A | 11/2000 |
| KR | 101471104 B1 | 12/2014 |

\* cited by examiner

HANDLEBAR STEM

BACKGROUND

1. Field of the Disclosure

The disclosure relates to a handlebar stem for bicycle handlebars, in particular handlebars of racing bicycles.

2. Discussion of the Background Art

It is known to connect a handlebar stem, which connects a steer tube to the handlebar, to the steer tube such that a holding element is arranged in the steer tube together with a clamping element which is designed as a cone, for example. The holding element is formed integrally with the stem. The holding element is clampingly fastened in the steer tube by a widening of the holding element which is slit in particular in the longitudinal direction thereof.

Further, stems are known which comprise a holding element that is set onto the steer tube and encloses the steer tube in the mounted state. The holding element is slit in the manner of a clamp. The width of the slit is reduced by means of screws directed generally tangentially to the steer tube, so as to obtain a clamping fixation of the handlebar stem to the steer tube. Further, together with the handlebar stem, the handlebar is typically also fastened by means of a clamping fixation, wherein the same is often designed as a two-piece clamping element. The handlebar is clampingly fastened to the stem element mostly by using four screws. The stem element is formed integrally with the holding element and forms the link between the holding element connected to the steer tube and a fixing element holding the handlebar.

It is an object of the disclosure to provide an improved handlebar stem, in particular to design the handlebar stem such that a secure fastening of the handlebar stem to the steer tube is ensured in a simple manner.

SUMMARY

The handlebar stem of the present disclosure comprises a holding element for connecting the handlebar stem to a steer tube. The holding element surrounds the steer tube at least in part, in particular completely. The holding element is connected, in particular formed integrally with a stem element. The stem element, which in the mounted state extends in the longitudinal direction of the bicycle, supports the handlebar at the end opposite the holding element. The connection may be made by means of a fixing element that connects the handlebar to the stem element in particular by clamping. According to the disclosure a clamping element is arranged in the holding element. In the mounted state, the clamping element is arranged between the holding element and the steer tube. At least one, preferably two clamping means act on the clamping element, which means are in particular stud screws or grub screws. By means of the at least one clamping means a clamping force is exerted on the holding element so as to fix the handlebar stem to the steer tube.

By providing a clamping element arranged inside the holding element of the handlebar stem it is possible and preferred according to the disclosure to provide a non-slit, in particular closed holding element. In particular, this has the advantage that the stem has a higher strength, that in case of composite materials the fiber composite can be used in a load-optimized manner, and that a homogeneous pressure distribution can be achieved.

Preferably, the holding element has at least one thickening in which the at least one clamping means is arranged. If a plurality of clamping means, in particular two clamping means are provided, they may be arranged in a common thickening. It is preferred to provide a separate thickening for each clamping means. In the mounted state the at least two thickenings are preferably arranged one above the other. Thus, in the mounted state, one thickening and preferably a clamping means arranged in this thickening are situated in the upper portion of the holding element and a second thickening with the second clamping means is arranged in the lower portion of the holding element. Thereby, a uniform clamping force can be transmitted and thus a secure clamped holding of the handlebar stem on the steer tube can be ensured. Specifically, tilting is avoided.

It is particularly preferred that the at least one clamping means directly generates a clamping force acting substantially orthogonally to the steer tube. Thereby, it is possible to achieve a good transmission of force. In contrast with a conventional fastening by means of a clamp-like clamping and clamping screws extending substantially tangentially to the steer tube, the present, substantially orthogonal arrangement of the clamping means has the advantage that a lower torque has to be applied to the clamping means, which in particular is a stud screw or a grub screw, in order to generate the necessary holding force. This is advantageous in particular if two clamping means are arranged spaced from each other, in particular vertically above each other, which both generate a clamping force that substantially acts orthogonally to the steer tube.

According to a particularly preferred embodiment the clamping element has at least one protrusion which, in the mounted state, protrudes into a recess in the holding element. Thereby, it is possible to define the position of the clamping element relative to the holding element. Preferably, the recess is arranged between two adjacent thickenings. As an alternative, the clamping element could also have a recess for defining this position, into which recess a protrusion of the holding element protrudes.

Further, it is preferred that the at least one clamping means is arranged on a rear side of the holding element, i.e. on a side of the holding element which, in the mounted state, is orientated opposite the traveling direction or towards the cyclist. In particular, this also enhances the aerodynamics.

In a particularly preferred embodiment of the disclosure, a thread is provided in the at least one thickening, into which thread the clamping means in the form of a screw, in particular a stud screw or a grub screw, is screwed.

Preferably, the clamping element is substantially crescent-shaped in cross section so that, in the mounted state, the clamping element is in contact, particularly in surface contact with the contact surface of the steer tube on the outer side of this tube, and the opposite side is in surface contact with the inner side of the holding element which preferably has a plurality of thickenings.

In a further preferred embodiment of the disclosure, the clamping element has a tube contact surface. In the mounted state, the same is in contact with the outer side of the steer tube so that the clamping force exerted by the at least one clamping means is transmitted to the steer tube via the clamping element. In this regard, the tube contact surface is preferably concave in shape, wherein the radius preferably substantially coincides with the radius of the steer tube.

The holding element connected to the stem element, in particular integrally formed therewith, preferably has a tube opening. In the mounted state, the steer tube is inserted into the same, with the steer tube being completely enclosed by the tube opening. Thus, in a preferred embodiment, the holding element is not slit. The clamping element is arranged inside the tube opening.

In a preferred embodiment the clamping element, which in particular is crescent-shaped in cross section, has two recesses into which the two thickenings of the holding elements protrude. Further, the clamping element preferably has a plurality of protrusions, wherein at least one, preferably two protrusions are arranged between the thickenings and a further protrusion is arranged above the upper thickening element and another protrusion is arranged below the lower thickening element. In particular, the clamping element is symmetrical so that it is possible to turn the clamping element by 180° around a horizontal axis. The positions of the upper and lower protrusions provided in a preferred embodiment can thus be switched. Thereby, assembly is facilitated.

In particular in the above described particularly preferred embodiments, the handlebar stem has the essential advantage that, besides a simplified clamping, a reduction in weight can also be achieved when compared with conventional handlebar stems.

In particular for a further reduction of weight, a bicycle handlebar of a particularly preferred development is formed integrally with the stem element, the handlebar in particular being a racing bicycle handlebar.

Preferably, the stem or the holding element of the stem is made of a fiber composite material, in particular CFC. Similarly, the steer tube together with the fork legs is preferably made of a fiber composite material, in particular CFC. The clamping element is preferably made of metal, in particular aluminum.

The following is a detailed explanation of the disclosure with reference to a preferred embodiment and to the accompanying drawings.

DETAILED DESCRIPTION OF THE PREFERRED EMBODIMENT

Figure 1:
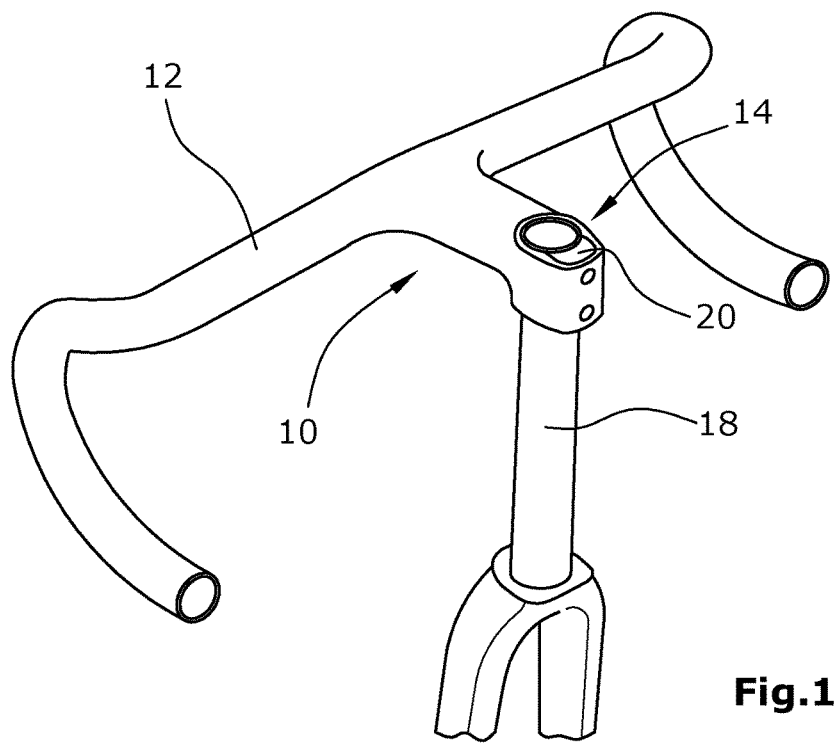
FIG. 1 is a schematic perspective view of a handlebar stem mounted on a steer tube, the stem being integrally connected with the handlebar.

In the embodiment illustrated, the handlebar stem has a stem element 10. In the embodiment illustrated, the same is integrally connected or formed with a racing bicycle handlebar 12. As an alternative, the connection between the stem element 10 and a handlebar may also be made by means of conventional known clamping elements. Further, at the end opposite the handlebar, the stem element 10 is connected to a holding element 14, wherein, in the embodiment illustrated, the holding element 14 and the stem element 10 are formed integrally. The holding element 14 has a tube opening 16 (FIG. 2) which, in the mounted state, surrounds a steer tube 18 (FIG. 1).

A clamping element 20 is provided inside the tube opening and thus inside the holding element.

Figure 3:
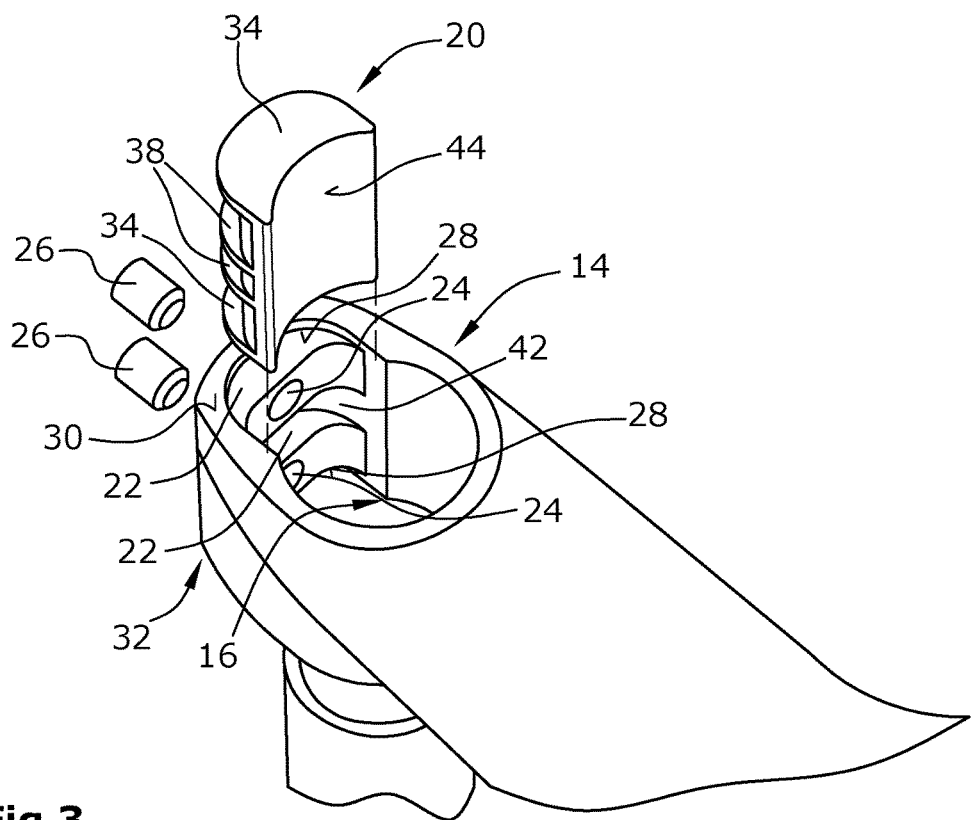
Figure 4:
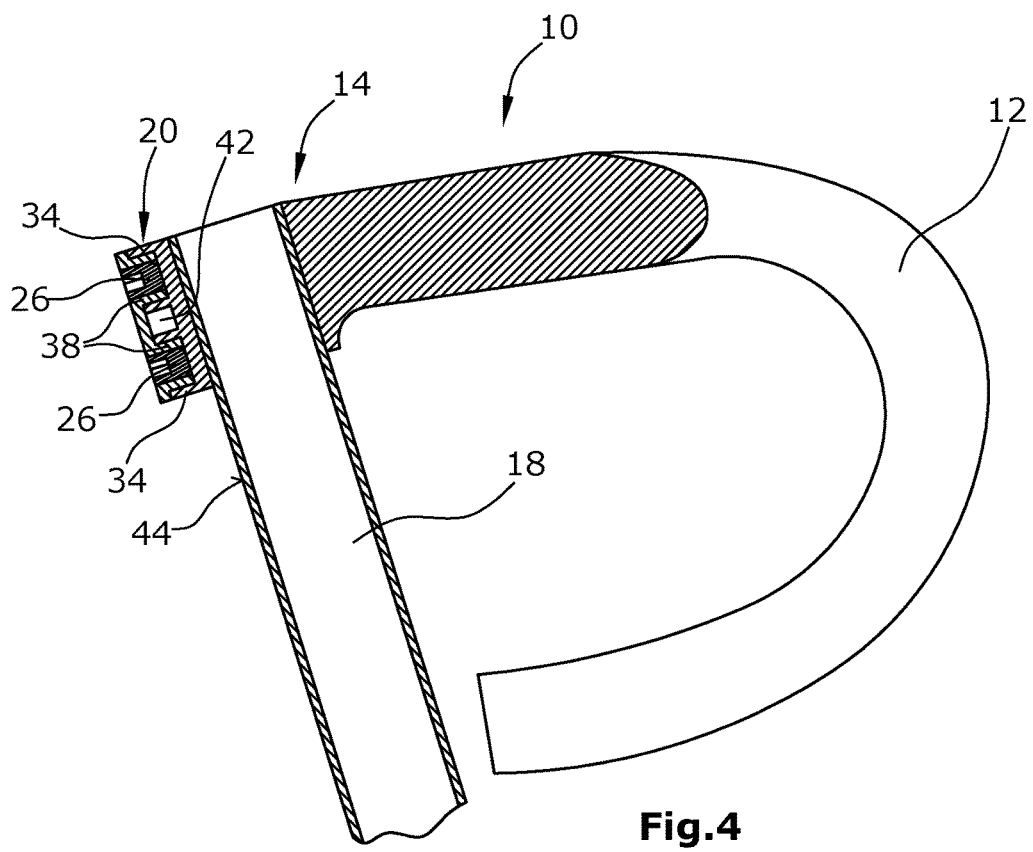

In the embodiment illustrated, the holding element 14 has two thickenings 22 (FIG. 3). The two thickenings 22 protrude into the tube opening 16. Further, in the mounted state, the two thickenings 22 are arranged in a direction opposite the traveling direction or in the side of the handlebar stem directed to the cyclist. A bore 24 with a female thread is respectively provided in each of the two thickenings 22. The clamping means, which in particular are stud screws or grub screws, are screwed into the bores 24 for mounting.

The outer sides 28 of the thickenings 22 are respectively recessed with respect to an upper side 30 and a lower side 32 of the holding element. This serves to receive an upper and a lower protrusion 34 of the clamping element 20.

Figure 2:
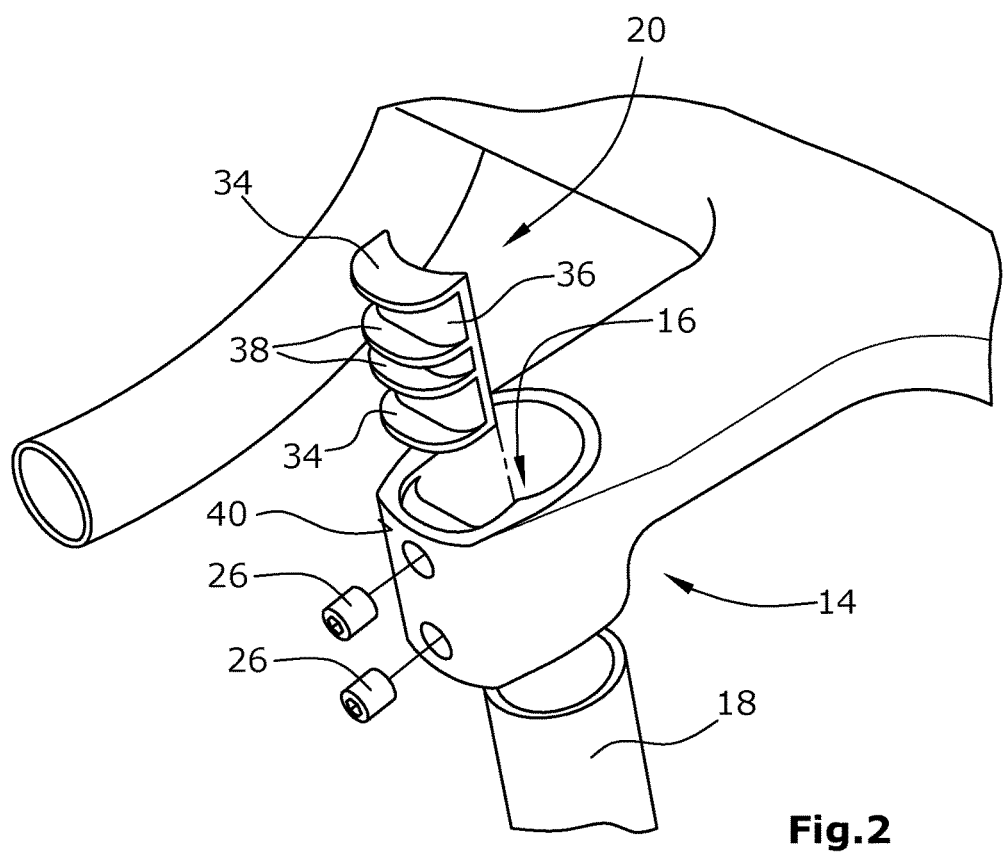
FIGS. 2 and 3 are schematic perspective exploded views of the respective parts and FIG. 4 is a schematic sectional view of the mounted handlebar stem along the longitudinal direction of the steer tube.

The clamping element 20 has a preferably crescent-shaped basic body 36 (FIG. 2). In the embodiment illustrated, the basic body is connected or integrally formed with four protrusions 34, 38 also of crescent-shape. In the mounted state, the protrusions 34, 38 are directed towards a rear end 40 of the holding element 14 pointing in a direction opposite the traveling direction. In the mounted state, the two inner protrusions 38, which may also be formed as a single wider protrusion, are arranged between the two thickenings 22 and in particular serve to exactly define the clamping element 20 in the tube opening 18 of the holding element 14. Here, the two protrusions 38 extend into a recess 42 formed between the two thickenings 22. The upper and the lower protrusion 34 rest on the outer surfaces 28 of the thickenings 22, respectively (FIG. 3).

The clamping element 20 preferably has a convexly shaped tube contact surface 44 (FIG. 3). The radius of the tube contact surface 44 substantially corresponds to the outer radius of the steer tube 18. In the mounted state (FIG. 3), the tube contact surface 44 thus is in contact with an outer side 46 of the steer tube 18.

For mounting, the clamping element 20 is inserted into the tube opening 16 and is moved to the left in FIG. 2 in the direction of the end 40 of the handlebar stem so that the protrusions 38 are arranged in the recess 42. Thereafter, the entire handlebar stem is set on the steer tube 18. The two stud screws 26 are then screwed into the thread bores 24 so that a force is exerted on the clamping element 20 via the screws 26 and thereby a clamping fixation on the outside of the steer tube 18 is achieved. Accordingly, assembly is very simple and ensures a reliable fixation.

What is claimed is:

1. A handlebar stem comprising:
    a holding element for connection to a steer tube, the holding element enclosing the steer tube at least in part,
    a stem element connected to the holding element, and
    a clamping element arranged inside the holding element, a clamping force for the fixation of the handlebar stem to the steer tube acting on the clamping element via at least one clamping screw which is at least partly arranged in the holding element,
    wherein the holding element has two adjacent thickenings that, in the mounted state, are arranged vertically above each other,
    wherein at least one clamping screw is arranged in each thickening, and
    wherein the clamping element has at least one protrusion which, in the mounted state, protrudes into a recess of the holding element, the recess being arranged between the two adjacent thickenings of the holding element.

2. The handlebar of claim 1, wherein the at least one clamping screw directly generates the clamping force substantially acting orthogonally relative to the steer tube.

3. The handlebar of claim 1, wherein a tube contact surface of the clamping element is shaped concavely, and wherein, in the mounted state, the tube contact surface is in contact with the steer tube.

4. The handlebar of claim 3, wherein the tube contact surface has a radius corresponding to a radius of the steer tube.

5. The handlebar of claim 1, wherein the clamping element has a substantially crescent-shaped cross section.

6. The handlebar of claim 1, wherein the at least one clamping screw is arranged in a rear side of the holding element.

7. The handlebar of claim 1, wherein the holding element has a tube opening which, in the mounted state, completely circumscribes the steer tube.

8. The handlebar of claim 1, wherein the at least one clamping screw is a stud screw or a grub screw.

9. The handlebar of claim 1, wherein the stem element is formed integrally with a handlebar.

10. The handlebar of claim 9, wherein the handlebar is a racing bicycle handlebar.

11. The handlebar of claim 1, wherein the holding element is not slit.

* * * * *